(12) United States Patent
Kemoun et al.

(10) Patent No.: US 8,017,095 B2
(45) Date of Patent: Sep. 13, 2011

(54) MIXING DEVICE FOR A DOWN-FLOW REACTOR

(75) Inventors: Abdenour Kemoun, Pleasant Hill, CA (US); Steven X. Song, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 242 days.

(21) Appl. No.: 12/475,209

(22) Filed: May 29, 2009

(65) Prior Publication Data
US 2010/0303685 A1 Dec. 2, 2010

(51) Int. Cl.
 *B01J 8/10* (2006.01)
 *B01J 19/00* (2006.01)
 *B01J 35/02* (2006.01)

(52) U.S. Cl. ........ 422/606; 422/645; 422/647; 422/648; 422/220; 422/224; 422/257

(58) Field of Classification Search .................. 422/606, 422/645, 647, 648, 220, 224, 257
See application file for complete search history.

(56) References Cited

U.S. PATENT DOCUMENTS

| | | | |
|---|---|---|---|
| 5,152,967 A * | 10/1992 | Rossetti et al. ............... | 422/605 |
| 5,690,896 A | 11/1997 | Stangel et al. | |
| 5,885,534 A | 3/1999 | Reynolds et al. | |
| 5,904,907 A | 5/1999 | Shih | |
| 5,958,220 A | 9/1999 | Reynolds et al. | |
| 6,183,702 B1 | 2/2001 | Nguyen et al. | |
| 6,387,334 B1 | 5/2002 | Krantz et al. | |
| 7,045,103 B2 | 5/2006 | McDougald et al. | |
| 7,473,405 B2 | 1/2009 | Kemoun et al. | |
| 2003/0146525 A1 | 8/2003 | Jacobs et al. | |
| 2004/0037759 A1 | 2/2004 | Van Vliet et al. | |
| 2004/0136886 A1 | 7/2004 | McDougald et al. | |
| 2005/0163682 A1 | 7/2005 | Jacobs et al. | |
| 2006/0078483 A1 | 4/2006 | Kemoun et al. | |

FOREIGN PATENT DOCUMENTS

| EP | 01056537 | 6/2000 |
|---|---|---|
| EP | 0768914 B1 | 6/2002 |

OTHER PUBLICATIONS

PCT Search Report—PCT/US2010/035731 Dec. 17, 2010 & Written Opinion.

* cited by examiner

*Primary Examiner* — Walter Griffin
*Assistant Examiner* — Lessanework Seifu
(74) *Attorney, Agent, or Firm* — Michael Ross; Susan Abernathy; Nirav Patel

(57) ABSTRACT

The present invention provides a novel means to provide more effective mixing of gas and fluids in a height constrained interbed space of a catalytic reactor without increasing pressure drop. In particular, the device improves the effectiveness of an existing mixing volume in mixing the gas phase and liquid phase of two-phase systems. According to the present invention, the mixing device helps create a highly arcuate flow to incoming effluents and a high degree of mixing within a constrained interbed space of a catalytic reactor.

20 Claims, 3 Drawing Sheets

MIXING DEVICE FOR A DOWN-FLOW
REACTOR

FIELD OF THE INVENTION

This invention relates to a mixing device for multi-bed hydroprocessing reactors. Specifically, the mixing device is for use in down-flow catalytic reactors which include vertically superimposed packed beds of particulate catalytic material wherein a liquid or liquid and gas mixture is processed as it flows down through the packed beds. This type of reactor is used in the petroleum and chemical processing industries for carrying out various catalytic reactions, such as hydroprocessing reactions including hydrotreating, hydrofinishing, hydrocracking, and dewaxing.

BACKGROUND OF THE INVENTION

In fixed-bed fuels and lube hydroprocessing units, gas and liquid flow downward through multiple beds of solid catalyst. Heat is released from the catalytic reactions causing temperature to increase with distance down the bed. Cool hydrogen-rich gas can be introduced between the beds to quench the temperature rise and replenish the hydrogen consumed by the reactions. In order to maintain overall reactor performance, the temperature and pressure of the fluids within the reactor should be as uniform as possible and any liquids and gases well mixed in order to maximize performance. Poor interbed fluid mixing can limit reactor operation in various ways. When interbed mixing is unable to erase temperature differences, these persist or grow as the process fluids move down the reactor. Hot spots in any bed can lead to rapid deactivation of the catalyst in that region which shortens the total reactor cycle length. Product selectivities are typically poorer at high temperatures. For example, hot regions can cause color, viscosity and other qualities to be off-specification. Also, if the temperature at any point exceeds a certain value (typically 800 to 850° F.), the exothermic reactions may become self-accelerating leading to a runaway which can damage the catalyst, the vessel, or downstream equipment. Due to these hazards, refiners operating with poor internal hardware must sacrifice yield and/or throughput to avoid the deleterious effects of poor interbed fluid mixing. Reactor temperature maldistribution and hot spots can be minimized through mixing and equilibration of reactants between catalyst beds, correcting any temperature and flow maldistributions, and minimizing pressure drops. The mixing of fluids between catalyst beds can be accomplished through the use of distributer assemblies and mixing chambers. With present day refinery economics dictating that hydroprocessing units operate at feed rates far exceeding design, optimum interbed fluid mixing is a valuable low-cost debottleneck.

Distributer assemblies can be used to collect, mix, and distribute fluids in the interbed region of multi-bed catalyst reactors. Distributor assemblies generally include a trough for collecting and mixing liquid and gas flowing from an overlying catalyst bed and a mixing device or chamber disposed centrally within the trough for receiving liquid from the trough and further mixing the liquid and gas. The mixing device is a key component of many distributor assemblies because it provides efficient and thorough mixing of fluids and helps avoid hot spots and poor temperature distribution. The mixing device has at least one inlet for receiving liquid from the trough and at least one outlet for directing flow toward an underlying catalyst bed. The mixing device will generally improve the mixing of liquids and gases through a turbulence or swirling effect. If present, the mixing device, is generally located in the interbed space between catalyst beds in a reactor. The interbed space in many reactors is limited due to the presence of support beams, piping, and other obstructions which occupy the interbed region. Due to these space constraints, unique hardware, such as a mixing device scaled to fit the space available, is required to perform efficient two-phase mixing in what amounts to limited volume.

Due to the importance of sufficient interbed fluid mixing for good catalyst lifetimes, high throughput, long cycle length, and overall reactor performance, improved mixing devices are needed. In addition, mixing devices that can be retrofitted to existing reactors which have limited interbed space are of particular necessity.

SUMMARY OF THE INVENTION

The invention provides a novel means to provide more effective mixing of fluids in the space between catalyst beds in a multi-bed reactor. In particular, the invention is direct to a mixing device that improves the effectiveness of an existing mixing volume in mixing the gas phase and liquid phase of two-phase systems. The device is well suited for retrofit applications due to its relatively small size and can also be scaled for new reactor designs to achieve efficient fluid mixing in the interbed space of a multi-bed reactor.

According to the invention, the mixing device for use in a multi-bed down-flow reactor is positioned in the interbed space in the reactor and attached to a generally annular collection plate. The collection plate collects liquids and gas, herein referred to collectively as "fluid" or "fluids" flowing from the overlaying catalyst bed and helps direct the fluids to the opening of the mixing device. Collection plates are well known in the art. The mixing device of the invention can be in a box-like chamber (mixing box) or simply disposed on top of the collection plate. The mixing device of the invention is generally cylindrical in shape with curved side walls and a planar top and bottom wall. The bottom wall of the mixing device is mounted to the collection plate in a fluid tight manner. In an embodiment, the cyclindrical side walls are mounted between the catalyst support beams.

The mixing device is generally cylindrical in shape with a) a generally circular top wall essentially parallel to the bottom of the first catalyst bed; b) a generally circular bottom wall essentially parallel to the top wall and comprising a generally circular centrally located outlet opening; c) a cylindrical divider wall between said top wall and said bottom wall in essentially fluid tight contact with said top and said bottom wall and wherein said divider wall has at least one opening that extends from the bottom of the divider wall to less than the full height of the divider wall; and d) at least one inlet passageway for fluid. In an embodiment, the mixing device further comprises at least one cylindrical riser wall wherein the riser wall surrounds the outlet opening and wherein the radius of the riser wall, as measured from the center of the outlet opening to the surface of the riser wall, is less than the radius of the divider wall, as measured from the center of the outlet opening to the surface of the divider wall, and wherein the riser wall is in fluid tight contact with the bottom wall but does not extend to the full height of the divider wall. As used herein "essentially parallel" means that two objects and/or components are within 5 degrees of being coplanar. The inlet passageway is formed by the outer surface of the divider wall, the divider wall opening, a curved side wall abutting the outer surface of the divider wall and encompassing the divider wall opening, and a top capping portion. The sidewall is connected to the divider wall in an essentially fluid tight manner. The side wall extends less than the full height of the divider wall and is level with the top of the divider wall opening. The capping top portion is in essentially fluid tight contact with the top of the side wall and the outer surface of the divider wall and level with the top of the divider wall opening. The divider wall, divider wall opening, side wall, and top capping portion form the at least one inlet passageway. The inlet passageway is of greater radius, as measured from the center of the outlet opening to the side wall, at the inlet passageway opening than at the sidewall divider wall opening thus forming a constricted passageway to thereby impart an arcuate flow to the entering fluid.

In an embodiment, as fluids enter the mixing device through the inlet, the inlet passageway volume tapers so as to increase the turbulence of the fluids within the mixing device and to direct the fluids in a swirling motion to the first mixing zone. The first mixing zone can be defined by the bottom of the mixing device, the exterior surface of the fluid stabilizer, the interior surface of the divider wall, and the exterior surface of the riser wall. As used herein, unless otherwise specified, "interior" surface refers to the surface facing a central axis which extends from the top wall through the center of the outlet opening. As used herein, unless otherwise specified, "exterior" surface refers to the surface facing the sidewall of the reactor. The riser is a cylindrical wall in fluid tight contact with the bottom wall of the mixing device and extending upward but not in fluid tight contact with the top wall of the mixing device. The exterior of the riser wall faces the interior of the divider wall. Attached to the exterior wall of the riser is the flow stabilizer which forms an interior channel within the mixing device and helps define the first mixing zone.

In an embodiment, fluids overflow the flow stabilizer and collect in the interstitial space between the flow stabilizer and the riser in a second mixing zone. The riser and flow stabilizer are designed to increase swirling and turbulence of the fluids allowing more effective mixing and temperature equilibration. In an embodiment, one or more perforated plates can be attached to the riser and/or flow stabilizer. If perforated plates are present, the fluids flow over and/or through the perforated plates, increasing droplet formation and improving mixing. The fluids enter a plurality of slots of a bubble cap 85 and overflow the top of the riser before entering the annular outlet region. The bubble cap 85 is attached to the top wall 49 of the mixing device 40 and descends parallel to the divider 45 and riser 75. The bubble cap 85 is approximately mid-way between the exterior wall of the riser 75 and the interior wall of the flow stabilizer 60. The bubble cap 85 is disposed over and about the riser 75 such that the top of the cap is above the top of the riser so as to provide a passageway for the fluids to enter the third mixing zone. The bubble cap 85 is generally cylindrical and has a diameter larger than the riser 75 but smaller than the diameter of the flow stabilizer 60 as measured from the top of the flow stabilizer to the center axis of the mixing device. The third mixing zone is defined by the annular passageway between the outer surface of the riser and the inner surface of the bubble cap. The slots 86 of the bubble cap 85 are substantially symmetrically disposed about the circumference of the bubble cap's open end and begin at the lower extremity and ascend substantially vertically up a portion of the bubble cap. This configuration allows fluids to pass from the second mixing zone to the third mixing zone prior to egress through the annular outlet.

The inner wall of the cylindrical walled riser forms the annular outlet 90. Optionally attached to the inner wall of the riser is a helicoidal perforated plate 75 which acts as a baffle to increase droplet formation and improve fluid mixing. The helicoidal perforated plate 75 does not extend the full diameter of the annular outlet 90. The helicoidal plate forms a semi-spiral baffle that is optionally fixed to the inner wall of the riser in the outlet region of the mixing device. Fluids egress the mixing device through the outlet and discharge on to the interbed re-distributor tray 31, FIG. 1, before contact the subsequent catalyst bed. Quench gas or fluid may be injected at multiple points into the collection plate or into the mixing device as desired.

The mixing device is configured for disposal and fixable attachment between the inner surfaces of the walls of a multi-bed downflow reactor and for disposal between vertically stacked catalyst beds within the reactor. The mixing device can be configured to fit between the catalyst support beams in an existing reactor in a retrofit application.

These and other features of the invention will be more readily understood upon reading the following Detailed Description in conjunction with the accompanying drawings.

DETAILED DESCRIPTION

In an embodiment, the mixing device of the invention is centrally disposed on top of the collection plate and between the catalyst support beams. The mixing device of the invention has at least one inlet for receiving fluids from the trough. In an embodiment, the mixing device has two inlets to receive fluids from the collection plate. The use of two inlets oriented at 180 degrees from each other with their openings situated so as to reinforce the circular, swirling motion of the incoming fluids improves the turbulence effect of the mixing device design.

Figure 1:
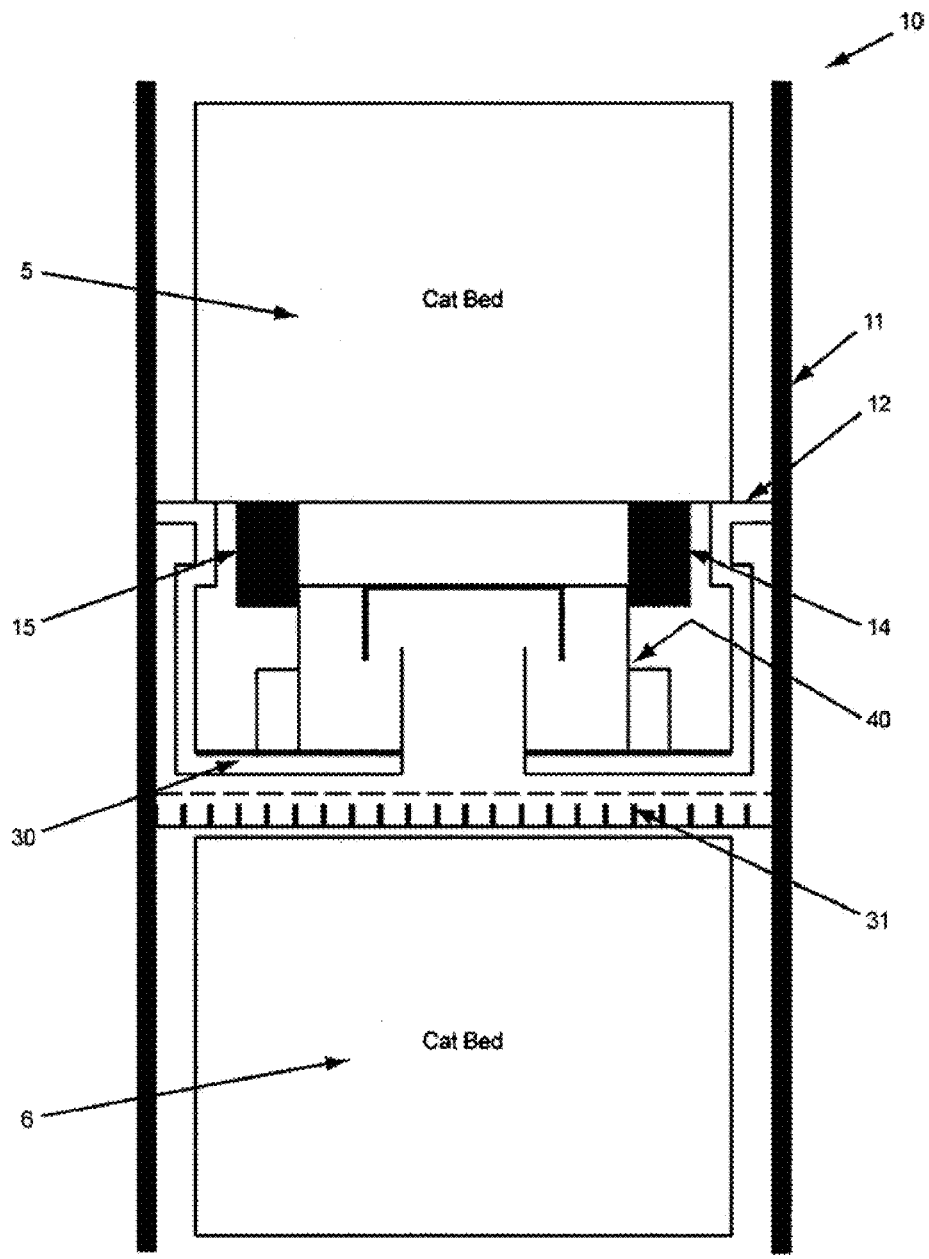
FIG. 1 is a schematic view of an embodiment of the mixing device of the invention situated within a multi bed catalytic reactor.

As shown in FIG. 1, a multi-bed, down-flow reactor 10 has a cylindrical sidewall 11. The section shown in FIG. 1 is a cross section of a multi-bed catalytic reactor. Each catalyst bed, 5 and 6, contain packed particulate catalytic material. Each catalyst bed is supported on a grid screen assembly 12 comprised of a support grid, space cloth and wire screen, all of which are well known in the art. The grid screen assembly is mounted on parallel support beams 14 and 15 that are horizontally mounted to the reactor wall 11. The mixing device 40 of the invention is mounted between the catalyst support beams, under the catalyst bed 5, and in fluid tight contact with the collection plate 30 to receive liquid and gas flowing down from the bottom surface of the overlying catalyst bed 5 and to mix the liquid and gas.

Figure 2:
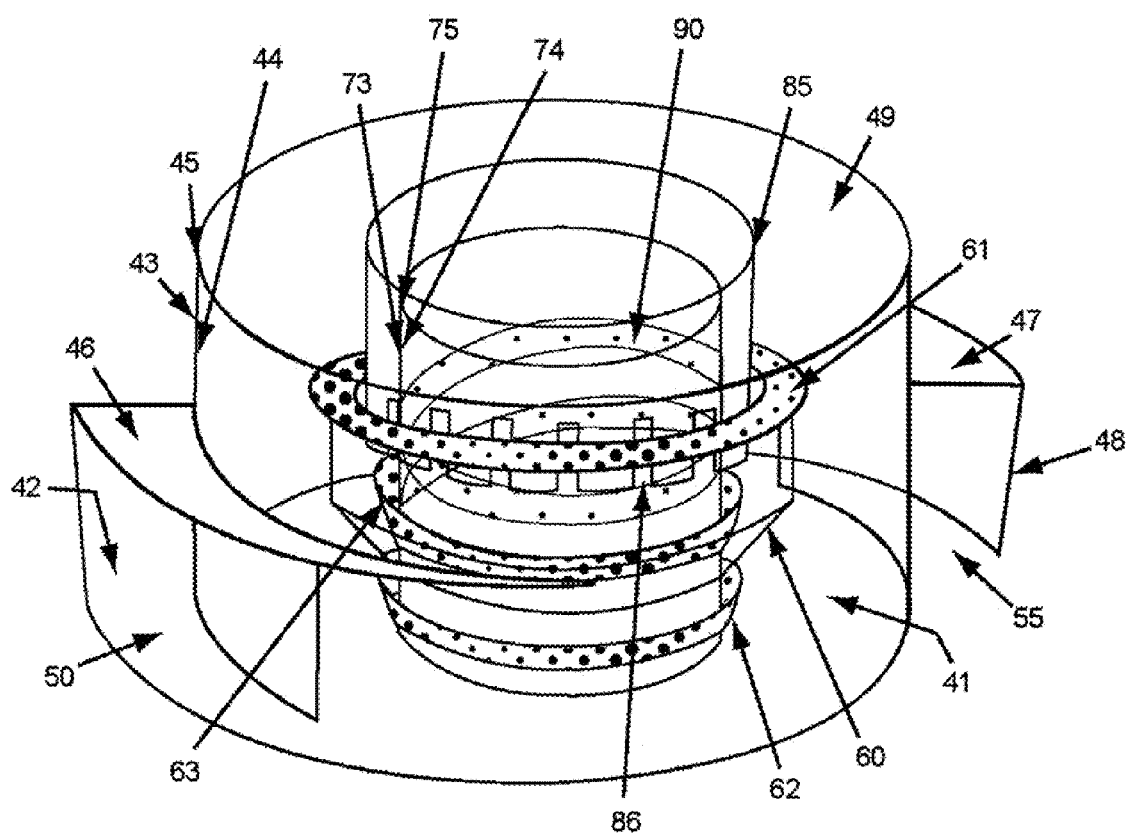
FIG. 2 is a transparent schematic perspective view of an embodiment of the invention.

FIG. 2 is a transparent schematic perspective view of an embodiment of the mixing device 40. A bottom wall of the mixing device 41 is mounted in fluid tight connection to the collection tray. The annular collecting tray collects fluids flowing down from the overlying catalyst bed prior to the fluids reaching inlet passageways 50 and 55 of the mixing device 40.

The mixing device 40 has cylindrical side walls 42 and 48 that are mounted in fluid-tight relation to the bottom wall 41. A top capping portion, 46 and 47, is mounted in fluid tight connection to the top of the side walls 42 and 48, respectively. A divider 45 spans the full height of the mixing device and is in fluid tight contact with the top wall, 49. The divider wall has an exterior surface, 43 and an interior surface, 44.

The mixing device 40 has a generally cylindrical shape adapted to extend upwardly from the collection tray 30 between the pair of cross beams 14 and 15 that support the overlying catalyst bed. In an embodiment, the mixing device 40 has a width adapted to occupy the space between the cross beams. The mixing device external surface is formed by side walls 42 and 48 of the inlets 50 and 55, the top wall 46 and 47 of the inlets, the top wall 49, and the exterior surface 43 of the divider 45. In an embodiment, the bottom wall 41 of the mixing device 40 is formed integrally with, and comprises a central portion of, the collecting tray 30. That is, the bottom wall of mixing device 40 can be formed by the collection tray itself. In another embodiment, the bottom wall of the mixing device is a separate wall and is mounted directly to the collecting plate in essentially fluid tight contact. The collecting tray 30 is mounted under and in close proximity to the cross beams so that the mixing device of the invention 40 is disposed between the central pair of cross beams, to thereby minimize the vertical space taken up by the mixing device 40. By minimizing the space needed for the mixing device, efficient use of overall volume of the reactor and higher catalyst fill volume can be achieved.

Figure 3:
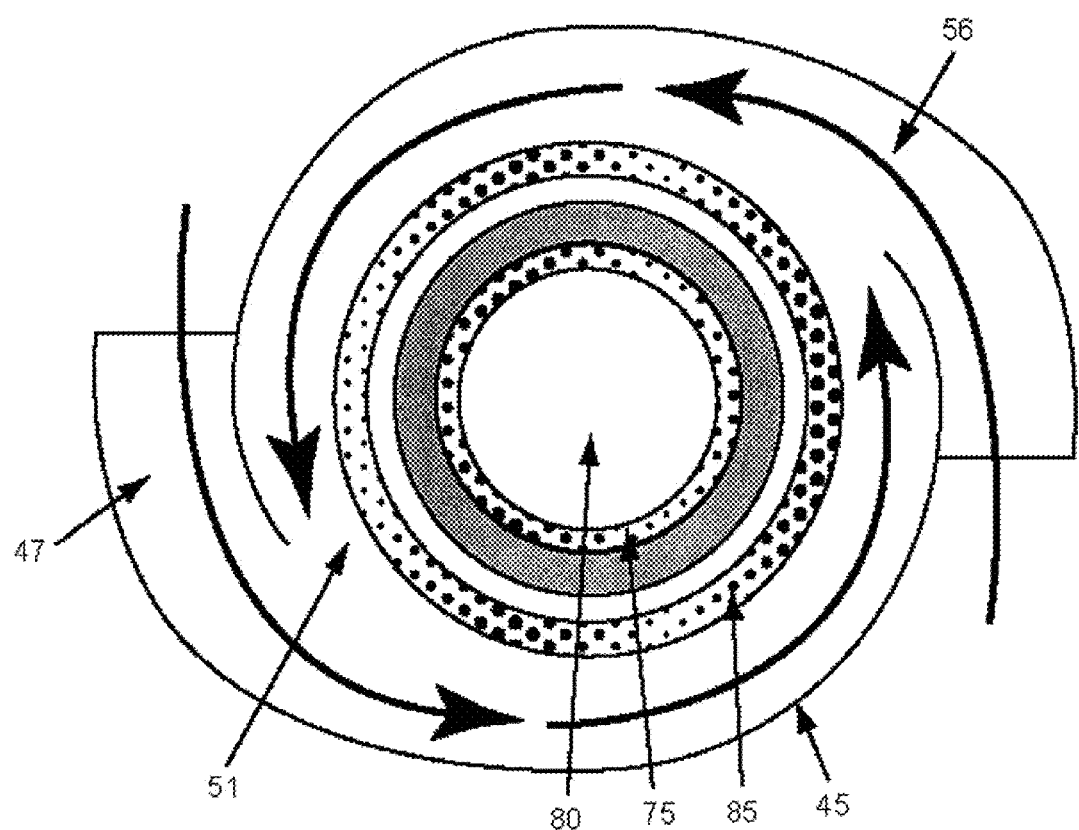
FIG. 3 is a top plan view of an embodiment of the invention.

In an embodiment, the mixing device 40 has two inlets 50 and 55 extending from the outer wall 42 and 48 respectively, and a single outlet 80 in the bottom center of the bottom wall 41 (as shown in FIG. 2 and FIG. 3). The outlet opening traverses the collecting tray 30. The inlet 50 formed by outer wall 42, top capping portion 46, bottom wall 41, and the exterior surface 43 of the divider wall 45, has an upstream end forming a rectangular opening for fluid entrance from the collecting tray 30. The inlet 55 formed by outer wall 48, top capping portion 47, bottom wall 41, and the exterior surface 43 of divider wall 45, has an upstream end forming a rectangular opening for fluid entrance from the collecting tray 30. The bottom edge of the divider wall 45 forms a substantially fluid-tight seal with the collecting tray 30, and the outer surface 43 of divider wall 45 forms a generally fluid-tight seal with the top capping portions 46 and 47 of the inlets 50 and 55, respectively. The two inlets 50 and 55 are designed to allow fluid entrance in the same direction of flow, that is the incoming fluids will reinforce the swirling direction of the fluids within the mixing device. The opening 51 and 56 (FIG. 3) in the divider wall allows fluid entrance into the first mixing zone of the mixing device 40.

As best seen in FIGS. 2 and 3, one inlet passageway is formed by the exterior surface 43 of the divider wall 45, the divider wall opening 51, the curved side wall 42 abutting the exterior surface 43 of the divider wall 45 and encompassing the divider wall opening, and a top capping portion 46. The sidewall 42 is connected to the divider wall 45 in an essentially fluid tight manner. The side wall 42 extends less than the full height of the divider wall 45 and is level with the top of the divider wall opening 51. The top capping portion 46 is in essentially fluid tight contact with the top of the side wall and the outer surface of the divider wall and level with the top of the divider wall opening. The inlet passageway is of greater radius, as measured from the center of the outlet opening to the side wall, at the inlet passageway opening 50 than at the divider wall opening 51 thus forming a constricted passageway to thereby impart an arcuate flow to the entering fluid. As shown in FIGS. 2 and 3, in an embodiment the mixing device has a second inlet opening 55. The second inlet passageway is formed in a similar manner to the inlet passageway described above. The second inlet passageway is formed by the exterior surface 43 of the divider wall 45, the divider wall opening 56, the curved side wall 48 abutting the exterior surface 43 of the divider wall 45 and encompassing the divider wall opening, and a top capping portion 47. The sidewall 48 is connected to the divider wall 45 in an essentially fluid tight manner. The side wall 48 extends less than the full height of the divider wall 45 and is level with the top of the divider wall opening 56. The capping top portion 47 is in essentially fluid tight contact with the top of the side wall and the outer surface of the divider wall and level with the top of the divider wall opening. The inlet passageway is of greater radius, as measured from the center of the outlet opening to the side wall, at the inlet passageway opening 55 than at the divider wall opening 56 thus forming a constricted passageway to thereby impart an arcuate flow to the entering fluid.

As fluid rains down at various locations into the annular collecting tray 30, the presence of inlets 50 and 55 creates an arcuate or circular mixing pattern of the fluids. The circular flow pattern in the horizontal plane of the trough induces relatively low energy mixing of the fluid in the pool with that fluid raining down from the catalyst bed, so that the fluid entering inlets 50 and 55 has relatively uniform temperature and composition. The size of the inlets 50 and 55, particularly, the width and height of the upstream and downstream ends thereof, is selected in view of the operating range of flow rate of liquid through the reactor 10. It will thus be seen that a pool of liquid of substantial depth can be accumulated in the collecting tray by means of the constricted inlet passageways. This is due to the fact that the mixing device is contiguous to the collecting plate and that the mixing device comprises the only outlet 80 from the collecting plate 30. The inlet passageway restrict the flow of fluids from the collecting plate 30 to cause fluids to accumulate on the plate and that also, by virtue of the constriction of the flow and expansion downstream thereof imparts turbulence to the liquid and gas stream exiting therefrom.

As may be seen in FIGS. 2 and 3, the inlet passageways to the mixing device 40 extend along the periphery of the mixing device and are radially offset from the axis of the reactor wall 11 and are also tangential to the circular outlet 80 formed in the bottom wall 41 of the mixing device. This orientation relative to the outlet 80, together with the annular shape of the flow passageway within the mixing device, imparts a rotating or spiraling flow pattern to the liquid and gas that is additive. Also, the taper of the inlet passageways converges in the direction of flow of liquid and gas from the collecting tray 30 into the mixing device 40, to thereby induce turbulence in the flow as the liquid and gas flows through the constricted downstream end of the inlet passageway into the first mixing zone of the mixing device 40. The radius formed from the center point of the outlet 80 and the cylindrical side wall 42 varies from a maximum at the inlet opening (50 and 55) to a minimum at the junction of the side wall (42 and 48, respectively) and the divider wall 45. The changing radius of the side wall 42 and the center point of the outlet 80, and side wall 48 and the center point of the outlet 80, creates the taper in the inlet passageways which increases the arcuate motion of the fluids entering the mixing device 40.

As fluids enter the mixing device 40 through inlets 50 and 55, they enter the first mixing zone. The first mixing zone is bounded by divider wall 45 and riser wall 75. Riser wall 75 comprises an exterior surface 73 and an interior surface 74. The outer surface 73 of riser 75, the inner surface 44 of the divider wall 45, and the top wall 49 delimit the first mixing zone. Projecting into the mixing zone from the outer surface 73 of riser 75 is one or more perforated plates and one or more flow stabilizers. As shown in FIG. 2, perforated plate 62 extends outward from the outer surface 73 of riser 75 into the first mixing zone. In an embodiment, the perforated plate forms an approximately 45 degree angle with the riser. The perforated plate 62 extends into the mixing zone towards the divider wall, 45, but does not intersect the divider wall.

A semi-cylindrical flow stabilizer 60 is mounted to the exterior surface 73 of the riser 75. The flow stabilizer 60 joins the riser approximately half the full height of the riser and projects outwardly into the space between the divider wall and the riser at an approximately 45 degree angle. The flow stabilizer continues this 45 degree outward projection until it is essentially level with a downward projecting bubble cap 85 and in the space between the bubble cap 85 and the divider wall 45. The flow stabilizer then projects upward parallel to the bubble cap 85 and the divider wall 45 until the top of the flow stabilizer is higher than the bottom of the downwardly projecting bubble cap but below the top wall 49 of the mixing device 40. The flow stabilizer constrains the fluid flow to the region of the mixing device delimited by the interior surface 44 of the divider wall 45 and the outer surface of the flow stabilizer. The angle of the flow stabilizer is designed to increase the swirling motion of the fluids in the mixing device and to increase turbulence. Optionally, the flow stabilizer can have a perforated plate 61 attached to its top portion and projecting into the space between the top of the flow stabilizer and the divider wall 45. The perforated plate 61 can be parallel with the top wall 49 and bottom wall 41 of the mixing device. The perforated plate 61 does not extend the full length of the space between the top of the flow stabilizer 60 and the divider wall 45.

As the fluids enter the first mixing zone they flow in an arcuate motion and contact perforated plate 62. The fluid level increases until the fluids are at the level of the top of the flow stabilizer 60. A perforated plate 61 located at the top of the flow stabilizer further increases droplet formation and improves mixing as the fluids overflow the flow stabilizer and enter the second mixing zone. The second mixing zone is delimited by the interior wall of the flow stabilizer 60 and the exterior wall 73 of the riser 75. The bubble cap 85, projects downward from the top wall 49 into the space between the flow stabilizer and the riser. The bubble cap has a plurality of slots 86 located essentially symmetrically about the bubble cap and extending from the bottom of the bubble cap part way up the height of the bubble cap. The top of the slots is lower than the top of the riser 75. Further liquid mixing and liquid-gas entrainment is provided by the combination of the perforated plate and bubble cap. The narrow bottom portion of the second mixing zone and the wider top portion help increase the swirling flow of the fluid. An optional perforated plate 63 projects into the second mixing zone to increase droplet formation. Perforated plate 63 is mounted to the exterior wall of riser 75 at an approximately 45 degree angle. The perforated plate 63 extends part way into the second mixing zone without contacting the flow stabilizer or the downward projecting bubble cap 85. Fluids fill the second mixing zone while maintaining a swirling flow until they reach the slots 86 of the bubble cap 85. The fluid then overflows the riser 75 and enters the third mixing zone.

The third mixing zone is delimited by the cylindrical interior wall 74 of riser 75. Optionally mounted to the interior wall of riser 75 is a helicoidal perforated plate 90. The helicoidal perforated plate 90 curves around the interior of the riser wall in the same direction as the fluid flow, further increasing the swirling motion of fluids through the mixing device. The helicoidal perforated plate 90 starts below the top of the riser 75 and curls or spirals downward in a corkscrew manner such that the height of the helicoidal plate at the end closest to the top of the riser 75 is greater than the height of the helicoidal plate and the opposite end closest to the outlet opening 80, where the height of the helicoidal plate is measured from the outlet opening and perpendicular to the bottom wall. The helicoidal plate 90 extends from below the top of the riser and ends above the outlet opening 80. The outlet opening 80 is formed by an annular opening in the bottom wall 41 and an annular opening in the collection tray 30. In an embodiment, outlet 80 is a generally circular aperture formed at the center of the collector tray 30 and coaxial with the axis of the reactor side wall 11. Fluids then exit the mixing device through outlet 80. One or more catalyst beds are located below outlet 80.

Quench gas (for example, hydrogen) can be injected through one or more tubes into the pool of fluid collected within the collecting tray 30 prior to entrance of the fluid into the mixing device. Quench gas injection at one or more locations can cause agitation of the pool of liquid at each location, to thereby enhance the mixing of liquid falling into and flowing through the trough prior to entry of the fluid into the mixing device.

The previous description of a preferred embodiment of the present invention is primarily for illustrative purposes, it being recognized that a number of variations might be used which would still incorporate the essence of the invention. Accordingly, reference should be made to the following claims in determining the scope of the invention.

We claim:

1. A mixing device mounted between two catalyst beds in a multi-bed down-flow catalytic reactor wherein said mixing device comprises:
   a. a generally circular top wall essentially parallel to the bottom of the first catalyst bed;
   b. a generally circular bottom wall essentially parallel to the top wall and comprising a generally annular centrally located outlet opening;
   c. a cylindrical divider wall between said top wall and said bottom wall in essentially fluid tight contact with said top and said bottom wall and wherein said divider wall has at least one opening that extends from the bottom of the divider wall to less than the full height of the divider wall; and
   d. at least one inlet passageway for fluid wherein said inlet passageway is formed by the outer surface of the divider wall, the divider wall opening, a curved side wall abutting the outer surface of the divider wall and encompassing the divider wall opening and wherein the sidewall is connected to the divider wall in essentially fluid tight contact and wherein said side wall extends less than the full height of the divider wall, and a capping top portion in fluid tight contact with the top of the side wall and the outer surface of the divider wall wherein the capping top portion is level with the top of the divider wall opening to form the at least one inlet passageway and wherein said inlet passageway is of greater radius, as measured from the center of the outlet opening to the side wall, at the inlet passageway opening than at the sidewall divider wall opening to form a constricted passageway to thereby impart an arcuate flow to the fluid.

2. The apparatus of claim 1, further comprising at least one cylindrical riser wall wherein the riser wall surrounds the outlet opening and wherein the radius of the riser wall, as measured from the center of the outlet opening to the interior surface of the riser wall, is less than the radius of the divider wall, as measured from the center of the outlet opening to the interior surface of the divider wall, and wherein the riser wall is in fluid tight connection with the bottom wall but does not extend to the full height of the divider wall.

3. The apparatus of claim 1, wherein the mixing device comprises at least two divider wall openings and at least two inlet passageways.

4. The apparatus of claim 3, wherein the divider wall openings are located 180 degrees from each other.

5. The apparatus of claim 1, wherein said apparatus is located in between catalyst bed support beams.

6. The apparatus of claim 2, further comprising a perforated plate mounted to the exterior of the riser wall at the junction of the riser wall and the bottom wall and projecting part way into the space between the riser wall and the divider wall.

7. The apparatus of claim 2, further comprising a flow stabilizer mounted at least part way up the riser wall and mounted to the exterior of said riser wall and projecting part way into the space between the riser wall and the divider wall.

8. The apparatus of claim 7, wherein the flow stabilizer projects at a 45 degree angle for at least a portion of the length of the flow stabilizer and then projects parallel to the divider wall for at least a portion of the length of the flow stabilizer.

9. The apparatus of claim 7, wherein the flow stabilizer further comprises a perforated plate extending parallel to the top and bottom wall.

10. The apparatus of claim 2, further comprising a bubble cap, wherein said bubble cap extends downward from the top wall and is located between the riser wall and the divider wall.

11. The apparatus of claim 7, further comprising a bubble cap, wherein said bubble cap extends downward from the top wall and is located between the riser wall and the flow stabilizer.

12. The apparatus of claim 10, wherein the bubble cap further comprises a plurality of essentially symmetrically disposed slots.

13. The apparatus of claim 11, wherein the bubble cap further comprises a plurality of essentially symmetrically disposed slots.

14. The apparatus of claim 7, further comprising a perforated plate mounted to the exterior of the riser wall between the top of the riser wall and the flow stabilizer.

15. The apparatus of claim 10, further comprising a perforated plate mounted to the exterior of the riser wall between the top of the riser wall and the flow stabilizer.

16. The apparatus of claim 2, further comprising a helicoidal perforated plate located on the interior wall of the riser and adjacent to the outlet opening, said helicoidal plate spiraling downwards toward the outlet opening in the direction of fluid flow.

17. The apparatus of claim 6, further comprising a helicoidal perforated plate located on the interior wall of the riser and adjacent to the outlet opening, said helicoidal plate spiraling downwards toward the outlet opening in the direction of fluid flow.

18. The apparatus of claim 7, further comprising a helicoidal perforated plate located on the interior wall of the riser and adjacent to the outlet opening, said helicoidal plate spiraling downwards toward the outlet opening in the direction of fluid flow.

19. The apparatus of claim 10, further comprising a helicoidal perforated plate located on the interior wall of the riser and adjacent to the outlet opening, said helicoidal plate spiraling downwards toward the outlet opening in the direction of fluid flow.

20. The apparatus of claim 14, further comprising a helicoidal perforated plate located on the interior wall of the riser and adjacent to the outlet opening, said helicoidal plate spiraling downwards toward the outlet opening in the direction of fluid flow.

\* \* \* \* \*